United States Patent Office 3,813,451
Patented May 28, 1974

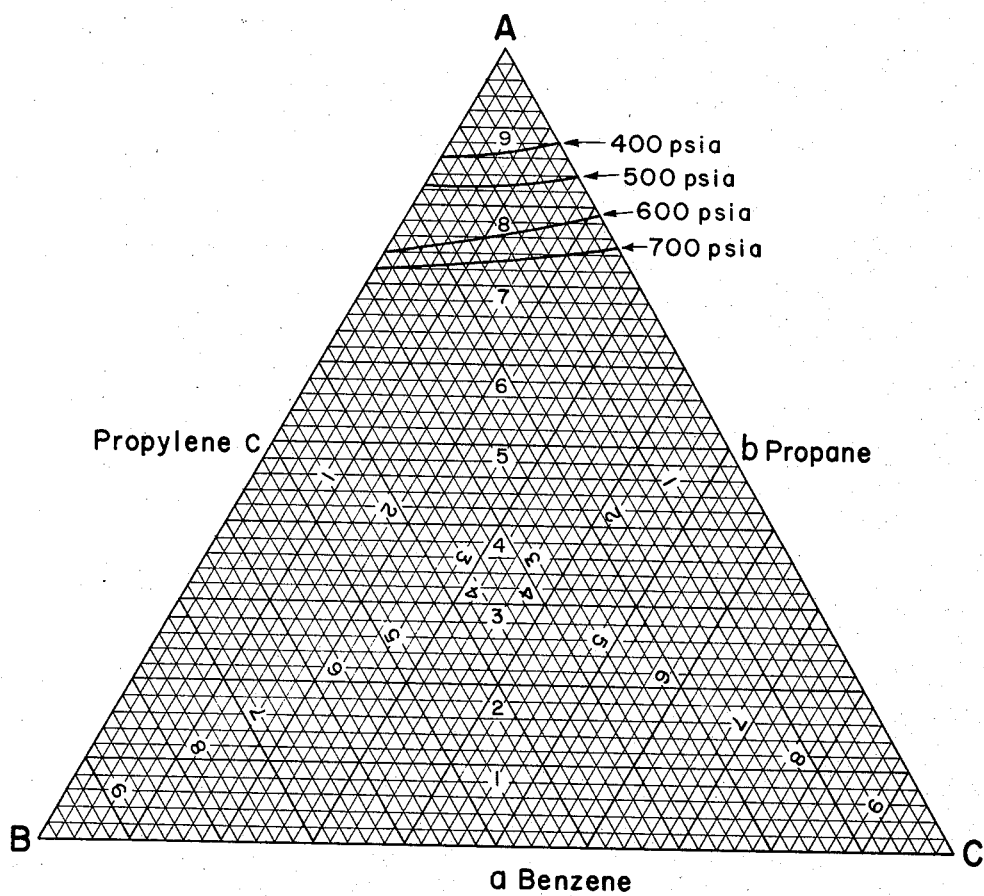
FIG. I.

3,813,451
PROCESS FOR ALKYLATION OF
AROMATIC COMPOUNDS
Robert C. Canfield, Alvin, Thomas E. Neta, Houston, and Robert F. Wiesenborn, Alvin, Tex., assignors to Monsanto Company, St. Louis, Mo.
Filed Jan. 16, 1973, Ser. No. 324,014
Int. Cl. C07c 3/54
U.S. Cl. 260—671 P                        10 Claims

ABSTRACT OF THE DISCLOSURE

A process for the preparation of monoalkylated aromatic compounds which comprises passing an alkylatable aromatic compound and an olefinic hydrocarbon through a reaction zone under alkylating conditions while maintaining said reactants substantially completely in the liquid phase and employing liquid reactants as a quenching medium for temperature control. If any unreactive diluent is present in the reaction mixture or quenching medium the mole ratio of the olefinic hydrocarbon to such inert hydrocarbon diluent is maintained at least about five to one. The process is particularly applicable to the preparation of cumene from benzene and propylene over a solid phosphoric acid catalyst.

BACKGROUND OF THE INVENTION

The present invention relates to the alkylation of an alkylatable aromatic compound with an olefinic hydrocarbon alkylating agent. More particularly, the present invention relates to an improved process for alkylation of benzene with propylene to produce cumene.

The present invention is broadly applicable to the production of alkylated aromatic hydrocarbons. These compounds are useful in themselves and more frequently in subsequent chemical synthesis of other compounds. The present invention is particularly applicable to the production of cumene or isopropylbenzene which is a reactant finding utility in the preparation of phenol, acetone, alphamethylstyrene and acetophenone. Another application of the process of the present invention may be found in the preparation of p-cymene which may be oxidized to produce p-cresol. A still further application of the process is the alkylation of a substituted aromatic compound such as phenol, which when alkylated with isobutylene forms o-tertiary-butylphenol and p-tertiary-butylphenol, both of which find utility in the resin field.

As above stated the present invention finds particular application in the preparation of cumene. In the usual commercial process for the production of cumene it has been the practice to charge liquid benzene and liquid propylene into a reactor containing one or more fixed beds of solid phosphoric acid catalyst. In order to minimize the production of dialkylated products of benzene it has been the practice to maintain a molar excess of benzene throughout the reaction ranging from about 4:1 to about 16:1, and more preferably about 8:1 of benzene to propylene. Two competing reactions with the desired production of isopropylbenzene have created problems in the prior commercial processes used. One of these as indicated above has been the formation of dialkylated benzenes such as diisopropylbenzene rather than the desired mono-alkylated product. This competing reaction has been controlled by means of employing large molar excesses of benzene as indicated above. The other competing reaction causing losses in the yields of cumene based on propylene reactant charged have arisen because of the formation of oligomers of propylene such as propylene dimer and trimer which occur to a limited extent even with the large molar excesses of benzene present. With the exception of the dimer the products of these competing reactions are higher boiling than the desired cumene product and are generally referred to as cumene bottoms products or high boilers.

The alkylation reaction of the alkylatable aromatic compound when conducted over a solid phosphoric acid catalyst is exothermic in nature and the temperature within the reactor tends to increase at a rapid rate. This increase in temperature caused by the exothermic reaction likewise tends to increase the production of high boilers or cumene bottoms products by the competing reactions. In the past it has been customary to control the temperature rise by dividing the catalyst into multiple separate beds and employing as a quenching medium an inert diluent vapor, usually a low boiling hydrocarbon such as ethane or propane, between each of several successive catalyst beds. This quenching has served to control the temperature at which the reaction mixture enters each successive bed and thus the temperature rise throughout each bed.

However, the use of an inert diluent vapor, usually propane in the case of the cumene producing process, which has been introduced both in the feedstream of reactant mixture as well as inter-bed between successive beds of catalyst as a quenching medium, has caused other problems to develop. Larger molar quantities of the diluent propane have tended to cause vaporization of more of the propylene reactant and hence its presence as vapor removed from the benzene reactant, which has caused additional oligomerization of the propylene to produce larger amounts of the oligomer impurities.

Hence, it has been desired to conduct the alkylation reaction entirely in the liquid phase, but this becomes very expensive in terms of pressure required or virtually impossible with increasing mole percents of the unreactive propane diluent present. Likewise, increasing quantities of the propane diluent work against the desired presence of large molar excesses of benzene to suppress the formation of diisopropylbenzene and the reaction. Even though use of more diluent propane and operation in two phases with the propylene and diluent virtually entirely in the vapor phase has been proposed, it has been found that this method of operation leads to poor yields based on the propylene reactant charged because of the increased vaporization of that propylene reactant.

SUMMARY OF THE INVENTION

There has now been found a process for maintaining all the reactants substantially in the liquid phase, and still making use of a quenching medium for controlling the temperature of the reaction medium which is quite efficient and successful.

The object of the present invention is an improved alkylation process for the production of mono-alkylated aromatic compounds. It is a specific object of this invention to produce cumene by a more efficient improved process therefor.

In the present invention a novel process has been discovered by which process improvements are realized in the production of cumene by carrying out the alkylation reaction substantially in the liquid phase in separate catalyst beds and introducing between at least two successive catalyst beds a mixture of liquid benzene and propylene reactants as a quenching medium. The process of the present invention produces high quality cumene product while minimizing production of the cumene bottoms product or high boilers and at the same time improves the yield realized on the propylene reactant charged. It also results in economies in equipment required for the process in that a smaller depropanizer column is required and the equipment can generally be designed to operate at somewhat lower overall pressures than is now common in commercial practice. The present invention may also be applied to obtain similar processing benefits in the production of other alkylated aromatic compounds. The above objectives are accomplished by a process for producing mono-alkylated aromatic compounds which comprises passing an alkylatable aromatic compound and an olefinic hydrocarbon in a mole ratio of from 4:1 to 16:1 into a reaction zone containing a solid phosphoric acid catalyst in the form of at least two successive fixed separate catalyst beds, maintaining the reactants in substantially liquid phase at alkylation conditions comprising a temperature of from about 300° to about 550° and a pressure of from about 300 to 900 p.s.i.g., introducing into the reaction mixture between at least two successive catalyst beds a mixture of the liquid reactants as quenching medium in an amount sufficient to reduce the temperature of the reaction mixture to within about 25° F. of the temperature of the reaction mixture entering the last preceding catalyst bed, and recovering monoalkylated aromatic compounds from the effluent from said reaction zone.

The process of the present invention can utilize as alkylated aromatic compounds aromatic hydrocarbons such as benzene, toluene, the xylenes, ethylbenzene, n-propylbenzene, isopropylbenzene, n-butylbenzene and higher molecular weight alkyl aromatic hydrocarbons such as hexylbenzene, nonylbenzene and naphthalene and the like, as well as substituted aromatic hydrocarbons such as phenol, cresol or hydroxyanisole. Likewise, the olefinic hydro-carbons suitable for use in the alkylation reaction include mono-olefins such as ethylene, propylene, 1-butenes, 2-butenes, iso-butylene and higher molecular weight normally liquid mono-olefins as well as cyclo-olefins such as cyclopentene, cyclohexene and the like. However, the preferred embodiment of this invention comprises the process wherein the aromatic compound is benzene and the olefinic hydrocarbon alkylating agent is propylene and the desired mono-alkylated aromatic compound is cumene. Therefore, the remainder of the description will be directed toward this preferred embodiment of the present invention.

DESCRIPTION OF THE DRAWING

FIG. 1 is a graph of the bubble point compositions of the system benzene-propylene-propane at 425° F.

DESCRIPTION OF PREFERRED EMBODIMENTS

The preferred embodiment of the present invention is more particularly characterized as a process for the production of cumene which comprises passing benzene and propylene in a molar ratio of from 4:1 to 16:1 through a reaction zone containing a solid phosphoric acid catalyst in the form of at least two successive fixed separate catalyst beds, maintaining the reactants in substantially liquid phase at alkylation conditions comprising a temperature of from about 300 to about 550° F., preferably from about 350° to 480° F. and a pressure of from about 300 to about 900 p.s.i.g., preferably from about 350 to 650 p.s.i.g., introducing into the reaction mixture between at least two successive catalyst beds a mixture of liquid reactants as quenching medium in an amount sufficient to reduce the temperature of the reaction mixture between said beds to within about 25° F. of the temperature of the reaction mixture entering the last preceding catalyst bed, and recovering high purity cumene from the effluent from said reaction zone.

As more clearly set forth hereinafter it has been found that the process of the present invention is best carried out when the mole ratio of propylene to any propane present in the reaction mixture and in the quenching medium is maintained at least about 5:1 and preferably at from about 6:1 to 50:1.

The primary requirement of the present invention is the carrying out of the alkylation of benzene by propylene substantially entirely in the liquid phase, i.e. all of the reactants are maintained substantially in the liquid phase. Since both propylene reactant and any inert propane present in the reaction mixture vaporize much more readily than the benzene reactant it will be apparent that increasing concentrations of both propylene and propane will require the use of increasing pressures to maintain all the reactants in liquid phase. Thus, it is desired in the present process to maintain the concentration of the propylene reactant and most particularly any propane diluent at relatively low concentrations.

From a detailed study of the bubble point compositions of the system benzene-propylene-propane at typical alkylation reaction temperatures and pressures it has been determined that the system can be maintained substantially in the liquid phase if attention is given to the mole percentages of the various hydrocarbons in that system. Typical results of such study are summarized in FIG. 1 of the drawing. Thus, it has now been found that the system benzene-propylene-propane can be maintained substantially in liquid phase at a pressure of 400 p.s.i.a. and 425° F., a typical alkylation reaction temperature at which the alkylation reaction is normally substantially complete, if the mole percentage of the benzene reactant is maintained at least about 88 mole percent. Likewise, the same system at 425° F. will be maintained in liquid phase at 500 p.s.i.a. if the benzene reactant is present at about 84 percent, and at 600 p.s.i.a. when the benzene is present at about 77 mole percent. Thus, the required maintenance of the reaction mixture in substantially liquid phase can be achieved by observance of two conditions, both of which contribute to the improved results found with the present novel process. First the benzene reactant must be maintained in substantial molar excess, i.e. at least about 4:1 to 16:1 and preferably from about 6:1 to 10:1. At the same time the molar ratio of propylene reactant to any propane diluent present is maintained at least about 5:1 and preferably at least about 6:1 or higher. The higher molar ratio of benzene to propylene reactant is advantageous in that production of dialkylated cumene is decreased. It was totally unexpected to find that maintaining the presence of propane diluent as low as possible likewise contributed to the lower production of propylene oligomers and other high boiling impurities while at the same time increasing the yield of desired cumene product on the propylene charged.

Thus, the present novel invention is in contradistinction to the normal prior art cumene alkylation processes in that the presence of propane diluent is kept as low as possible. Thus, there is no recycle whatsoever of propane recovered in the first separation zone to which the effluent from the alkylation reactor is directed, since it is desired to keep the presence of such propane diluent in the reaction mixture as low as possible. It was likewise unexpected to find that adequate and efficient quenching between successive catalyst beds can be carried out with a liquid mixture of the reactants comprising the reaction mixture and that an inert hydrocarbon diluent such as propane was not required for this purpose.

The process of the present invention can be quite successfully carried out when employing as the alkylating olefinic hydrocarbon a stream of 100 percent propylene and under such conditions no propane diluent would be present. However, in commercial practice the propylene feed streams available typically contain some propane in varying amounts as well as traces of ethane and butane. It is advantageous that these streams containing some propane can likewise be employed as propylene feed for the process. It is only necessary that the streams be ones in which the propylene to propane mole ratio is at least about 5:1, streams of from about 85 percent propylene with no more thane about 15 percent propane present therein. Such propylene streams useful in the present invention are more preferably those containing from about 90 percent propylene and not greater than about 10 percent propane diluent.

Another unexpected advantage of the present process has been found as a result of the use of the liquid reactants as quenching medium. This injection of liquid reactants into the free space between successive catalyst beds serves to reduce any channeling effect which might develop in any separate bed with extended use of the catalyst and improves the distribution of liquid reactants fully across the succeeding beds. Both because no vapor phase of propylene is present and because of the high mole ratio of benzene to propylene reactant the yield of cumene product based on propylene charged is improved and production of propylene oligomers is reduced.

A further advantage of the present process is that it can be operated in either a downflow or an upflow manner and retain the advantages inherent therein. For convenience, the process has been illustrated in the examples in a downflow configuration, but this manner of operation is not essential to the present process. Likewise, the process of the invention can be carried out in a series of separate catalyst beds in separate reaction chambers which are connected by piping, or in a single reactor containing two or more beds of catalyst supported by grids or other means with catalyst-free spaces between each pair of beds. This latter form of a multi-bed reactor is more common in the industry and is the form employed in the examples herein.

The process of the present invention possesses a distinct advantage that no recycle of propane diluent from the effluent separation and recovery zone need be provided. Thus, the depropanizer column typically present in a commercial cumene process can be of substantially smaller size than in the prior art processes presently used. Likewise, from the above bubble point composition data it is evident that overall pressures in the process can be maintained at substantially lower levels than are presently common in commercial cumene alkylation processes. This likewise contributes to economies in the design and installation of both the reactor and recovery vessels involved in the process.

A more complete appreciation of the effectiveness of the improvements realized by the present invention is afforded by the following examples and table of data which are presented to illustrate the present invention. These examples and table of data were obtained from commercial aromatic alkylation units. They comprise a condensation of commercial operating data.

EXAMPLE I

A cumene producing alkylation unit containing 82,000 pounds of solid phosphoric acid catalyst in a fixed bed reactor containing five separate beds was operated according to the present invention. Benzene, propylene and propane were mixed in a tank in a ratio of 13.4 moles of benzene per mole of propylene. The propane was part of the propylene stream which stream assayed 93.3 percent by weight propylene, the remainder being essentially propane. No propane was recycled from the process to the above feedstream. A portion of the benzene was recycled from the process and a portion was drawn from fresh supply. In a second vessel recycled benzene, propylene and propane were also mixed in a ratio of 1.2 moles benzene per mole of propylene, the propylene being derived from the same propylene stream which assayed 93.3 percent propylene. No propane was recycled from the process to this mixing tank for quench medium. The overall benzene to propylene ratio in the liquid quench and reactor feed was a mole ratio of 7.9:1.

The reactant feedstream consisting of the mixture in the first vessel having a benzene/propylene mole ratio of 13.4:1 was heated to 370° F. in a heat exchanger and fed downflow through the reactor totally in the liquid phase under a pressure of 585 p.s.i.g. The mixed benzene, propylene and propane quench medium in the second vessel having a benzene/propylene ratio of 1.2:1 was pumped at its ambient temperature of 110 to 130° F. and injected into the free space between the second and third and third and fourth catalyst beds to serve as a means of temperature control in the reaction zone. This quench medium stream from the second vessel also remained totally in the liquid phase. The temperature across the reaction zone ranged from 370° F. at the inlet to 444° F. at the outlet. The alkylation reaction took place mainly in the third and fourth beds of the reactor since the catalyst was several months old and that in the first two beds had become relatively inactive. This was evidenced by the temperature increase across these beds which were in the third bed 35° F. and in the fourth bed 57° F. The inlet temperatures in each of the five beds were respectively 370°, 372°, 352°, 380° and 441° F.

The effluent exiting the reaction zone was fed to a conventional refining system consisting of three fractionation columns. In the first fractionation column the propane was removed overhead and discharged from the process. In the second fractionation column the excess benzene was taken overhead and recycled to the process as recycle benzene to the alkylation reactor feed and quench medium mixing tanks. The third fractionator recovered purified cumene product overhead. The remaining bottom stream from the third fractionator consisted primarily of the diisopropylbenzene isomers and propylene oligomers termed cumene bottoms product or high boilers. The cumene product in this example assayed 99.28 percent cumene with a bromine number of 0.37.

EXAMPLE II

The same cumene alkylation process unit containing 82,000 pounds of solid phosphoric acid catalyst described in Example I was employed. The reactant feedstream consisting of benzene, propylene and propane was mixed in a tank in a ratio of 12.6 moles benzene per mole of propylene. The propane was part of the propylene stream assaying 93.32 percent by weight propylene, the remainder being essentially propane. No propane was recycled from the process to the reactant feed mixing tank. A portion of the benzene was recycled from the process and a portion was drawn from fresh supply. In a second vessel the quenching medium consisting of benzene, propylene and propane was mixed in a ratio of 1.6 moles benzene per mole of propylene, the propylene being drawn from the same stream with an assay of 93.32 percent propylene. No propane was recycled from the process to this second mixing vessel. The overall benzene/propylene mole ratio charged to the reactor was 7.8:1.

The reactant feed in the first vessel having a mole ratio of 12.6 benzene to propylene was heated to 370° F. by a heat exchanger and fed downflow through the above reactor totally in the liquid phase with the reactor under a pressure of 500 p.s.i.g. The quench medium from the second vessel having a benzene/propylene mole ratio of 1.6:1 was pumped at its ambient temperature of 110 to 130° F. and injected between the second and third and between the third and fourth catalyst beds as a means of controlling the temperatures in the reaction zone. This second stream also remained totally in liquid phase. The temperatures across the reaction zone ranged from 372° F. at the inlet to 442° F. at the outlet. The temperature increase across the third and fourth catalyst beds were respectively 34° and 59° F. The inlet temperature in each of the five catalyst beds were respectively 372°, 374°, 353°, 373° and 438° F.

The effluent from the reaction zone was fed to a conventional refining system consisting of three fractionation columns. In the first fractionation column propane was removed overhead and discharged from the process. In the second fractionation column the excess benzene was taken overhead and recycled to the reactor feed and quench streams while the bottoms from this fractionator were fed to a third fractionation column which produced overhead a purified cumene product. The bottom stream from the third fractionation column consisted primarily of high boiling products or cumene bottoms product. The cumene product produced in this example assayed 99.33 percent cumene with a bromine number of 0.56.

EXAMPLE III

The same cumene unit as described in Example I was employed in this example. The alkylation reactor feedstream was mixed in a ratio of 13.2 moles benzene per mole of propylene with a propylene stream assaying 93.26 percent by weight propylene, the remainder being essentially propane. No recycled propane was employed in this reactor stream mixture. In a second vessel the quench medium was mixed in a ratio of 1.7 moles benzene per mole of propylene employing the same propylene stream as above. The overall benzene/propylene mole ratio in the reactor charge was 7.9:1.

The reactant mixture from the first vessel having a benzene/propylene ratio of 13.2:1 was heated to 370° F. and fed downflow through the reactor totally in the liquid phase with the reactor under a pressure of 385 p.s.i.g. The quench medium from the second vessel having a benzene/propylene mole ratio of 1.7:1 was pumped at its ambient temperature of 100 to 130° F. and injected fully in liquid phase between the second and third and third and fourth catalyst beds as a means of control of the temperatures in the reaction zone. The temperature across the reaction zone ranged from 368° F. at the inlet to 441° F. at the outlet. The increase in temperature in the third and fourth catalyst beds respectively was 32° and 58° F. The inlet temperatures in each of the five catalyst beds were respectively 368°, 370°, 350°, 366° and 434° F.

The effluent from the reaction zone was fed to a conventional refining system consisting of three fractionation columns. The first of such fractionation columns removed the propane overhead and discharged same from the process. In the second fractionation column the excess benzene was taken overhead and recycled to the alkylation reactor feed and quench mixtures. The third fractionator fed with the bottoms of the second fractionation column produced a purified cumene product overhead and a bottoms product consisting primarily of diisopropylbenzene isomers and propylene oligomers. The cumene product produced in this example assayed 99.42 percent cumene with a bromine number of 0.67.

EXAMPLE IV

This example represents operation in the manner of the prior art of the same cumene producing alkylation unit described above containing approximately 83,000 pounds of solid phosphoric acid catalyst in five separate fixed beds. The alkylation reactor feed was mixed in a tank in a ratio of 8.5 moles of benzene per mole of propylene and one mole of propane per mole propylene. The propane was derived as part of the propylene stream, which assayer 92 percent by weight the remainder being propane, and additional propane recycled from the process.

The reactor feed having a benzene to propylene mole ratio of 8.5:1 and a propylene to propane ratio of 1:1 was heated in a heat exchanger to 370° F. and fed downflow through the reactor as a two phase stream under a pressure of 585 p.s.i.g. Liquid propane drawn from the recycled propane from the process was pumped between each of the successive catalyst beds in which the temperature rise in the first bed was greater than 30° F. as a means for the control of temperature in the reaction zone. This propane quench stream vaporized in the reactor. The temperature across the reaction zone ranged from 370° F. at the inlet to 430° F. at the outlet. In no case did the inlet temperature of each succeeding catalyst bed following a propane quench addition exceed by more than 25° F. the inlet temperature of the next preceding catalyst bed.

The effluent from the reaction zone was fed to a conventional refining system consisting of three fractionation columns. In the first fractionation column the propane was removed overhead and recycled to the reactor feed mixture and as quench medium. In the second fractionation column the excess benzene was taken overhead and recycled to the process as recycled benzene to the alkylation reactor feed mixture. The third fractionation column produced a purified cumene product as overhead and a bottom stream consisting primarily of the diisopropylbenzene isomers and propylene oligomers as high boilers or cumene bottoms product. The cumene product produced in this example assayed 99 plus percent with a bromine number of less than 1.0.

EXAMPLE V

A cumene alkylation process unit containing 92,500 pounds of solid phosphoric acid catalyst in a reactor of five separate fixed catalyst beds was operated in the standard prior art manner as set out in Example IV above. The reactor feedstream was mixed in a tank in a ratio of 7.0 moles benzene per mole of propylene and one mole of propane per mole of propylene. The propylene stream assayed 92 percent by weight propylene the remainder being propane and the remaining part of the propane feed was drawn from propane recycled from the process.

The reactor feedstream was heated to 355° F. in a heat exchanger and fed downflow through the reactor as a two phase stream under a pressure of 585 p.s.i.g. Liquid propane was pumped to the reactor and injected into the free space between each of the successive catalyst beds wherein the first of the two beds showed a temperature increase of greater than 30° F. as a means to control temperatures in the reaction zone. This propane quench stream vaporized in the reactor. The temperature range across the reaction zone ranged from 355° F. at the inlet to 430° F. at the outlet. The inlet temperature to each of the succeeding catalyst beds following addition of propane quench did not exceed by more than 25° F. the inlet temperature of the next preceding catalyst bed.

The effluent from the reaction zone was fed to a conventional refining system consisting of three fractionation columns. The first fractionation column removed propane overhead which was recycled to the reactor feed and as quench medium. The second fractionation column removed as overhead the excess benzene which was recycled to the alkylation reactor feed system. The third fractionation column removed overhead a purified cumene product and produced a bottom stream consisting primarily of diisopropylbenzene isomers and propylene oligomers. The cumene product produced in this example assayed 99 plus percent cumene with a bromine number of less than 1.0.

The data from the above examples are condensed and summarized as in Table 1 where significant calculations are reported. It will be noted that the operation during the various tests periods summarized in the examples was relatively constant with the exception of the overall system pressures maintained in the second and third examples. At the reactor inlet the temperature of about 370° F. was maintained while the overall benzene to propylene mole ratio was held at approximately 8:1 with the exception of Example V. The overall flow rates of the reactor feed do not vary greatly nor did that of the flow rates of the quenching medium employed during any of the examples summarized.

TABLE 1.—SUMMARY OF EXAMPLES

| Example | I | II | III | IV | V |
|---|---|---|---|---|---|
| Mole ratios: | | | | | |
| Benzene/propylene in feed | 13.42 | 12.58 | 13.17 | 8.5 | 7.0 |
| Benzene/propylene in quench | 1.21 | 1.63 | 1.66 | 0 | 0 |
| Benzene/propylene overall | 7.92 | 7.76 | 7.85 | 8.5 | 7.0 |
| Propane/propylene in feed | .075 | .075 | .076 | 1.0 | 1.0 |
| Propane/propylene in quench | .075 | .075 | .076 | 00 | 00 |
| Operating conditions: | | | | | |
| Total benzene, lbs./hr | 125,372 | 124,712 | 130,383 | 125,562 | 117,694 |
| Total propylene, lbs./hr | 8,530 | 8,660 | 8,950 | 7,960 | 9,060 |
| Quench flow, g.p.m. | 43 | 50 | 52 | 45 | 45 |
| Pressure, p.s.i.g. | 585 | 500 | 385 | 585 | 585 |
| Reactor inlet temp., °F | 370 | 372 | 368 | 370 | 355 |
| Reactor outlet temp., °F | 444 | 442 | 441 | 430 | 430 |
| Product and usage rates: | | | | | |
| Cumene, lbs./hr | 21,240 | 21,920 | 21,980 | 19,900 | 22,230 |
| Cumene bottoms, lbs./hr | 740 | 760 | 815 | 754 | 918 |
| Cumene, percent | 99.28 | 99.33 | 99.42 | 99+ | 99+ |
| Bromine No. | 0.37 | 0.56 | 0.67 | <1.0 | <1.0 |
| Benzene/cumene, lb./lb | .6711 | .6655 | .6652 | .6742 | .6612 |
| Propylene/cumene lb./lb | .3903 | .3924 | .3907 | .0413 | .4050 |
| Cumene bottoms/cumene, lb./lb | .0349 | .0347 | .0371 | .0385 | .0416 |

In Table 1 operation of the process in the manner of the present invention is illustrated by Examples I, II and III, while operation in the manner of the prior art with liquid propane only employed as the quenching medium is illustrated by Examples IV and V. It will be observed that at generally equivalent flow rates of benzene and propylene reactants excellent high purity cumene product of greater than 99% purity and a bromine number of less than 1.0 was produced in each example set forth. But when Examples I through III are compared with Examples IV and V the improved yield of cumene product on propylene charged and decreased formation of cumene bottoms product is evident. Thus, the usage rate of propylene per pound of cumene product was reduced from a range of .4013 to .4050 pound per pound in Examples IV and V to a range of .3903 to .3924 pound per pound in Examples I, II and III, a reduction of .012 pound or 3 percent on the average of propylene reactant required per pound of high purity cumene product. This improvement is further borne out by the reduction of almost 10 percent of cumene bottoms product produced per pound of cumene from an average of .0401 pound per pound to .0356 pound per pound in the examples of the present invention. This above data clearly demonstrates the improved efficiency and productivity of the process of this invention.

The examples summarized in Table 1 also demonstrate the advantages of the present process in affording efficient operation without the necessity of recycle of a large proportion of diluent propane to the reaction from the recovery section of the process, as required by the prior art. In none of Examples I through III was any recycle propane or concentrated propane from any source employed. Thus the necessity for a depropanizer column to accommodate large quantities of inert diluent propane is obviated and a much smaller column can be employed. Likewise, Example III clearly illustrates that the fully liquid phase reaction can be carried out at reactor pressures lower than are common in the prior art processes, the reactants being maintained in liquid phase at a reactor pressure of only 385 p.s.i.g. This enables economies to be made in the design and fabrication of reaction vessels and piping.

Although this invention has been described and illustrated with reference to the process for producing cumene, the inventive principles apply as well to the other alkylation processes referred to above, including the synthesis of p-cumene, tert-butyl phenol and butylated hydroxyanisole. Thus, it may be applied where the inert diluent is at least as high boiling as propane, such as butane or isobutane diluents when butylene or isobutylene are used as olefinic hydrocarbons in like alkylation reactions of aromatic hydrocarbons.

What is claimed is:

1. In the process for producing cumene by reacting benzene and propylene in a reaction zone containing a solid phosphoric acid catalyst in the form of at least two successive separate catalyst beds and recovering cumene from the effluent from said reaction zone, the improvement comprising maintaining the reactants in substantially liquid phase at a benzene to propylene molar ratio of from 4:1 to 16:1 at alkylation conditions comprising a temperature of from about 300° to about 550° F. and a pressure of from about 300 to 900 p.s.i.g., and introducing into the reaction mixture between at least two successive catalyst beds a mixture containing benzene and propylene liquid reactants as quenching medium in an amount sufficient to reduce the temperature of the reaction mixture to within about 25° F. of the temperature of the reaction mixture entering the last preceding catalyst bed.

2. The process of claim 1 wherein the mole ratio of propylene to inert liquid diluent in the reaction mixture is maintained at least about 5:1.

3. The process of claim 1 wherein the mole ratio of propylene to propane in the reaction mixture is maintained at about 6:1 to 50:1.

4. The process of claim 1 wherein the mole ratio of the total benzene to propylene charged to the reaction zone is maintained from about 6:1 to 10:1.

5. The process of claim 1 wherein the reaction zone temperature is from about 350° to about 480° F.

6. The process of claim 1 wherein the reaction zone pressure is from about 350 to about 650 p.s.i.g.

7. The process of claim 1 wherein the mixture of liquid reactants charged to the first catalyst bed comprises a benzene to propylene molar ratio of greater than 8:1 and the mixture of liquid reactants charged between the successive catalyst beds comprises a benzene to propylene molar ratio of less than 8:1.

8. The process of claim 1 wherein the molar ratio of the total benzene to propylene charged to the reaction zone is maintained at about 8:1, the molar ratio of propylene to propane charged to the reaction zone is maintained at least about 5:1, the reaction zone temperature is from about 350° to about 480° F. and the reaction zone pressure is from about 350 to 650 p.s.i.g.

9. The process of claim 1 wherein the propylene reactant feedstream comprises at least about 85 percent propylene and not more than 15 percent propane.

10. The process of claim 1 wherein the propylene reactant feedstream comprises at least about 90 percent propylene and not more than 10 percent propane.

References Cited

UNITED STATES PATENTS

| 2,382,318 | 8/1945 | Ipatieff et al. | 260—671 P |
| 3,478,119 | 11/1969 | Maier et al. | 260—671 R |
| 3,527,823 | 9/1970 | Jones | 260—671 P |
| 3,632,659 | 1/1972 | Jones | 260—671 R |

CURTIS R. DAVIS, Primary Examiner

U.S. Cl. X.R.

260—671 C, 671 R